United States Patent
Rank et al.

(10) Patent No.: US 9,792,346 B2
(45) Date of Patent: Oct. 17, 2017

(54) AUTOMATIC MODE SWITCHING IN A SYNCHRONOUS REPLICATION ENVIRONMENT

(71) Applicants: Christopher H. Rank, Longmont, CO (US); Rene Quakkelaar, Ter Aar (NL); Elena Lora-Gallardo, Issy les Moulineaux (FR)

(72) Inventors: Christopher H. Rank, Longmont, CO (US); Rene Quakkelaar, Ter Aar (NL); Elena Lora-Gallardo, Issy les Moulineaux (FR)

(73) Assignee: SYBASE, INC., Dublin, CA (US)

( * ) Notice: Subject to any disclaimer, the term of this patent is extended or adjusted under 35 U.S.C. 154(b) by 251 days.

(21) Appl. No.: 14/462,870

(22) Filed: Aug. 19, 2014

(65) Prior Publication Data
US 2015/0379107 A1    Dec. 31, 2015

(30) Foreign Application Priority Data
Jun. 26, 2014  (EP) .................................. 14290187

(51) Int. Cl.
*G06F 17/30*   (2006.01)

(52) U.S. Cl.
CPC .. *G06F 17/30581* (2013.01); *G06F 17/30575* (2013.01)

(58) Field of Classification Search
CPC ..................... G06F 17/30575; G06F 17/30581
USPC ............................................ 707/674; 711/162
See application file for complete search history.

(56) References Cited

U.S. PATENT DOCUMENTS

| | | | | |
|---|---|---|---|---|
| 8,341,115 B1 * | 12/2012 | Natanzon | ............ | G06F 11/1471 707/613 |
| 2002/0133507 A1 * | 9/2002 | Holenstein | .......... | G06F 11/2064 707/2 |
| 2006/0195666 A1 * | 8/2006 | Maruyama | ............ | G06F 3/0613 711/162 |
| 2009/0313311 A1 * | 12/2009 | Hoffmann | ............ | G06F 11/2094 707/204 |
| 2011/0320403 A1 * | 12/2011 | O'Krafka | .......... | G06F 17/30581 707/620 |

* cited by examiner

*Primary Examiner* — Chelcie Daye
(74) *Attorney, Agent, or Firm* — Schwegman Lundberg & Woessner, P.A.

(57) ABSTRACT

Disclosed in some examples is a method of database replication, the method including at a Relational Database Management System (RDMS), determining a first replication mode; identifying a triggering event; determining that the triggering event indicates a change in the first replication mode; responsive to determining that the triggering event indicates a change in the first replication mode, determining a second replication mode, the second replication mode being a different replication mode than the first replication mode; identifying a database change made by one or more database tasks; and replicating the database change to an external replication component according to the second replication mode.

20 Claims, 6 Drawing Sheets

AUTOMATIC MODE SWITCHING IN A SYNCHRONOUS REPLICATION ENVIRONMENT

CLAIM OF PRIORITY

The present patent application claims the priority benefit of the filing date of European Application (EPO) No. 14 290 187.5 filed Jun. 26, 2014, the entire content of which is incorporated herein by reference.

BACKGROUND

A Relational Database Management System (RDMS) is a database management system that is based on the relational database model. A database management system may be a software application (which may execute on one or more hardware resources) providing the interface between users (e.g., database tasks) and a database or databases. The RDMS provides for storing data in a database, defining and manipulating data structures from the database, updating data in the database, deleting data in the database, inserting data in the database, retrieving data from the database, administering the database and other functions.

An RDMS operates on the concept of transactions. A transaction is a unit of work performed within a database management system against a database, and is treated in a coherent and reliable way independent of other transactions. A transaction typically ends with the issuance of a COMMIT instruction and may contain one or more database changes.

RDMS systems sometimes feature database replication. Database replication involves replication of transactional data in a RDMS across one or multiple databases to allow for multiple copies of the database to be stored in multiple electronic locations. In some examples, this may be desirable so as to provide distributed access, allow users to better share information, and to provide backup copies of the database. Replication of data from a database in a RDMS is often achieved by replicating transaction log records from the database transaction log (hereinafter the primary database) which are written when data stored in that same database is changed. The database transaction log may comprise a history of the modifications (transactions) done in the database.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1:
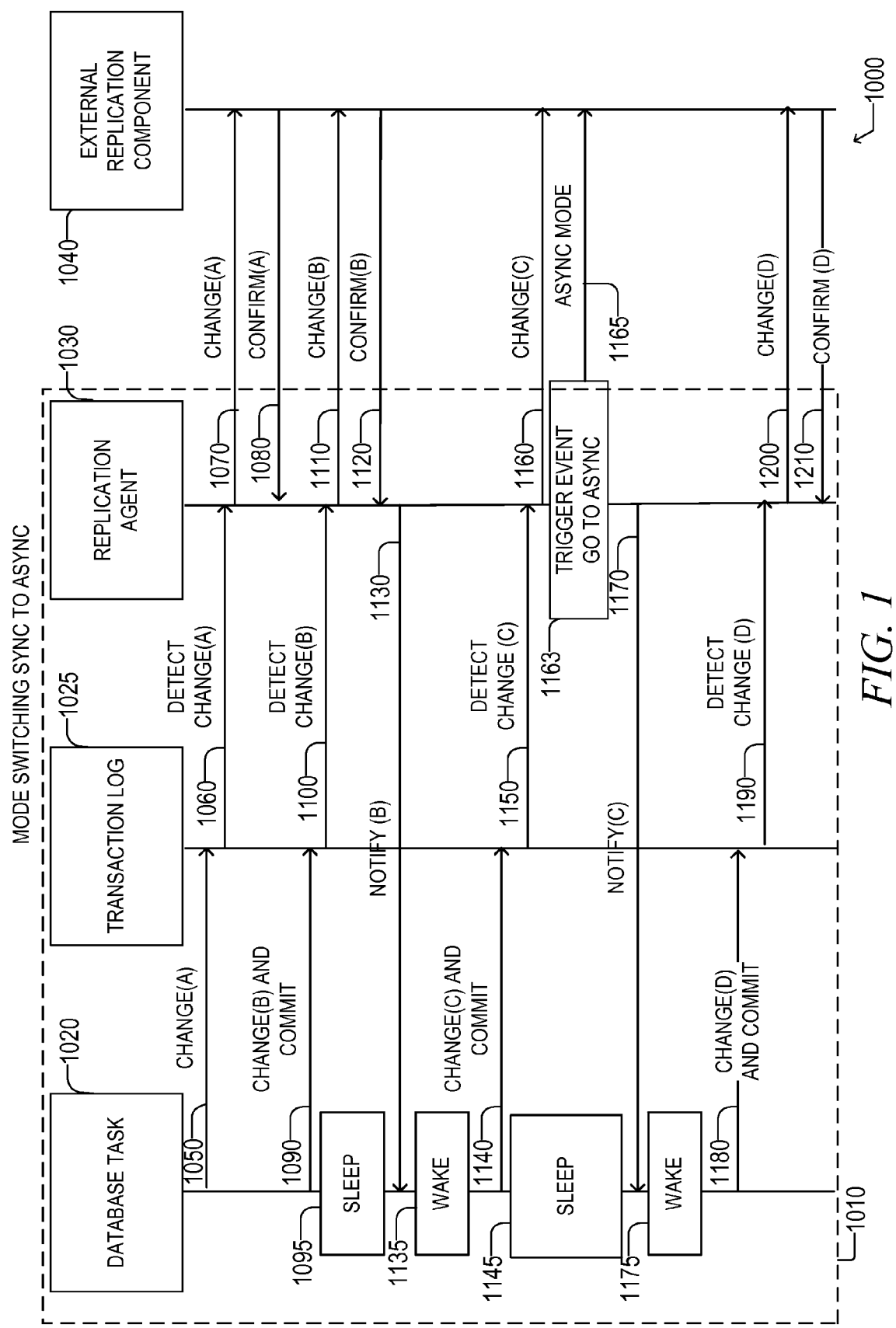
FIG. 1 shows a notification sequence chart of a replication mode switch from synchronous to asynchronous according to some example embodiments.

Replication of data from a database in a RDMS is often achieved by replicating transaction log records from the database transaction log (hereinafter the primary database) which are written when data stored in that same database is changed. The database transaction log can comprise a history of the modifications (transactions) done in the database. The changes to the transaction log are distributed to an external replication component, which is then responsible for replicating the transactional data towards other copies of the database on the other electronic locations. An external replication component can utilize a subscription process in which database servers that are interested in receiving updates to the replicated database subscribe to the external replication component. The subscription can be for portions of the database, but in other examples, the subscription may be for the entire database. Updates are then pushed to the subscribed devices based on the subscription.

Database replication can be described by a replication mode. A replication mode can be one or more rules that define how the replication is to be processed. Example modes can include asynchronous modes and synchronous modes. In asynchronous modes, a database task will not wait for the external replication component to acknowledge the log data before proceeding with operations. In synchronous modes, the database task will wait to proceed until the external replication component has acknowledged the change. A database task can be any process, thread, or program which makes changes to a database. In some example embodiments, database tasks can make changes to the database using a Structured Query Language (SQL).

The goal of synchronous replication is to ensure that in case of a major crash the committed data on the primary database will be on disk as well as on the replicated sites. Synchronous replication can negatively impact the database transaction response time if the communications between the source database and the external replication component are slow or non-functional. Asynchronous replication does not have any impact on the database transaction response time, but the database copies may be out-of-synch in case of a major failure of the primary database.

Disclosed in some example embodiments are methods, machines (e.g., database servers), and machine-readable mediums which are capable of switching, on the fly, between synchronous and asynchronous replication models based upon the situation and the needs of the database tasks. Embodiments switch between synchronous and asynchronous replication models automatically and without manual (e.g., human) intervention.

In some example embodiments, one or more triggering events can be detected or created which can change the database replication mode. For example, the interface between an external replication component and the database server can be a network (e.g., a packet based computer network). If the network is suffering from an outage, heavy traffic, or is too slow, the confirmation notification from the external replication component may not be delivered or may be delivered late to the RDMS. In the case of a synchronous replication, a database task waiting on the response can be stuck waiting for this confirmation. As a result, one example triggering event can be the expiration of a timer at the RDMS which can cause the RDMS to wake the database task before the RDMS receives the confirmation from the external replication component, and thus switching the replication mode to asynchronous.

FIG. 1 shows an example notification sequence chart 1000 of an embodiment of a replication mode switch from a synchronous to an asynchronous replication mode according to some examples of the present disclosure. RDMS 1010 can include a database task 1020. The database task 1020 can be any process, thread, or program which makes changes to a database. In some example embodiments, the database task 1020 can make changes to the database using a Structured Query Language (SQL). RDMS 1010 can also include a replication agent 1030. The replication agent 1030 can communicate with an external replication component 1040 and can be responsible for detecting changes to the database that are to be replicated. The RDMS 1010 can include additional modules not shown which manage the database, execute SQL statements, manage the database task 1020 and the like.

In the example of FIG. 1, the database task 1020 makes a database change (e.g., CHANGE(A)) and writes that change to the transaction log 1025 at 1050. At this point in the discussion of FIG. 1, the RDMS 1010 is in a synchronous replication mode. The replication agent 1030 detects the change to the transaction log at 1060. The replication agent 1030 can detect changes to the database (e.g., the change as a result of operation 1050) by monitoring the transaction log 1025 for a new log entry or for pending changes to the transaction log 1025 (e.g., changes queued for writing to the transaction log 1025). Upon detection of change 1050, the replication agent 1030 sends the detected changes to the external replication component 1040 with a message or notification 1070.

While FIG. 1 shows lines to/from the database task 1020, the transaction log 1025, the replication agent 1030, and from replication agent 1030 to/from the external replication component 1040, it is to be understood that such lines could be messages, but also could be other forms of notification including monitoring of log files, interprocess communications (e.g., shared memory), or any other form of communicating information. The notifications described in the Figures can be a basic signal (such as an interrupt), but also could contain more detailed information, such as information on the changes made to the database (e.g., log entries), and the like.

As change 1050 does not include a commit instruction, the database task 1020 does not wait for the change to be confirmed by the external replication component 1040 even in synchronous mode. A confirmation by the external replication component 1040 may be sent by the external replication component 1040 either when the external replication component 1040 receives a notification of a change or when the replication component 1040 applies the change to its own copy of the transaction log. A notification from the external replication component 1040 which confirms change A was received (or committed) by the external replication component 1040 is delivered to the replication agent 1030 at 1080.

The database task 1020 makes an additional change (e.g., CHANGE(B)) to the database and writes that change to the transaction log 1025 at 1090. The change (e.g., CHANGE (B)) includes a database commit instruction. As this change includes a commit instruction, the database task 1020 goes to sleep at 1095. In some examples, sleep includes suspension of operations until the replication agent 1030 receives a confirmation from the external replication component 1040. Once the replication agent 1030 detects the second change (e.g., CHANGE(B)) at 1100, the replication agent 1030 sends the change to the external replication component 1040 at 1110 for which the external replication component 1040 replies with a confirmation at 1120. The replication agent 1030 notifies the database task 1020 that the change was both written to disk and the external replication component 1040 confirmed at 1130. At this point, the database task 1120 wakes up in response to the notification 1130 at 1135 and begins processing again.

At 1140, the database task 1020 makes another database change (e.g., CHANGE(C)) and writes that change to the transaction log 1025. The change (e.g., CHANGE(C)) includes a commit instruction. As the additional change (e.g., CHANGE(C)) includes a commit instruction, the database task 1020 goes to sleep at 1145. The replication agent 1030 detects this change (e.g., CHANGE(C)) at 1150 and sends the change to the external replication component 1040 at 1160. At 1163, the replication agent detects a trigger event to switch replication modes. In some examples, the trigger event is detection that a timeout period has expired for receiving a confirmation notification from the external replication component 1040. For example, a confirmation notification that is expected to be sent by the external replication component 1040 to the replication agent 1030 may not reach the replication agent 1030 at the time desired (for example, because of a network problem). For example, at 1163, the replication agent 1030 detects the expiry of a timer and interprets the expiry of the timer as a trigger event to change replication mode to an asynchronous replication mode and switches the replication mode at 1163. The replication agent 1030 can notify the external replication component 1040 of the mode switch at 1165. In addition, the replication agent 1030 notifies the database task 1020 at 1170 even though the confirmation from the external replication component 1040 for the change (e.g., CHANGE(C)) was not received, for example, before a time period expired. The notification wakes the database task 1020 (or any other task awaiting a notification) at 1175. The database task 1020 can now make additional database changes. These changes are performed according to the asynchronous replication rules. For example, the database task 1020 makes another change (e.g., CHANGE(D)) and writes the change to the transaction log 1025 at 1180. The change (e.g., CHANGE (D)) includes a commit instruction. The change (e.g., CHANGE(D)), when detected by replication agent 1030 at 1190, is forwarded to the external replication component 1040 at 1200. The external replication component 1040 replies to the replication agent 1030 with a confirmation at 1210. Note that as the mode is now asynchronous, the database task 1020 does not go to sleep awaiting a notification from the external replication component 1040. Note that in addition to, or instead of, notifying the external replication component 1040 when a change occurs (e.g., at 1165), the replication agent 1030 can include information on the current mode when sending changes to the external replication component 1040. For example, the messages sent at 1070, 1110, 1160, and 1200 can specify the RDMS' current replication mode. The mode switch from synchronous to asynchronous may be communicated at operation 1200 with change (D) instead of at operation 1165.

Figure 2:
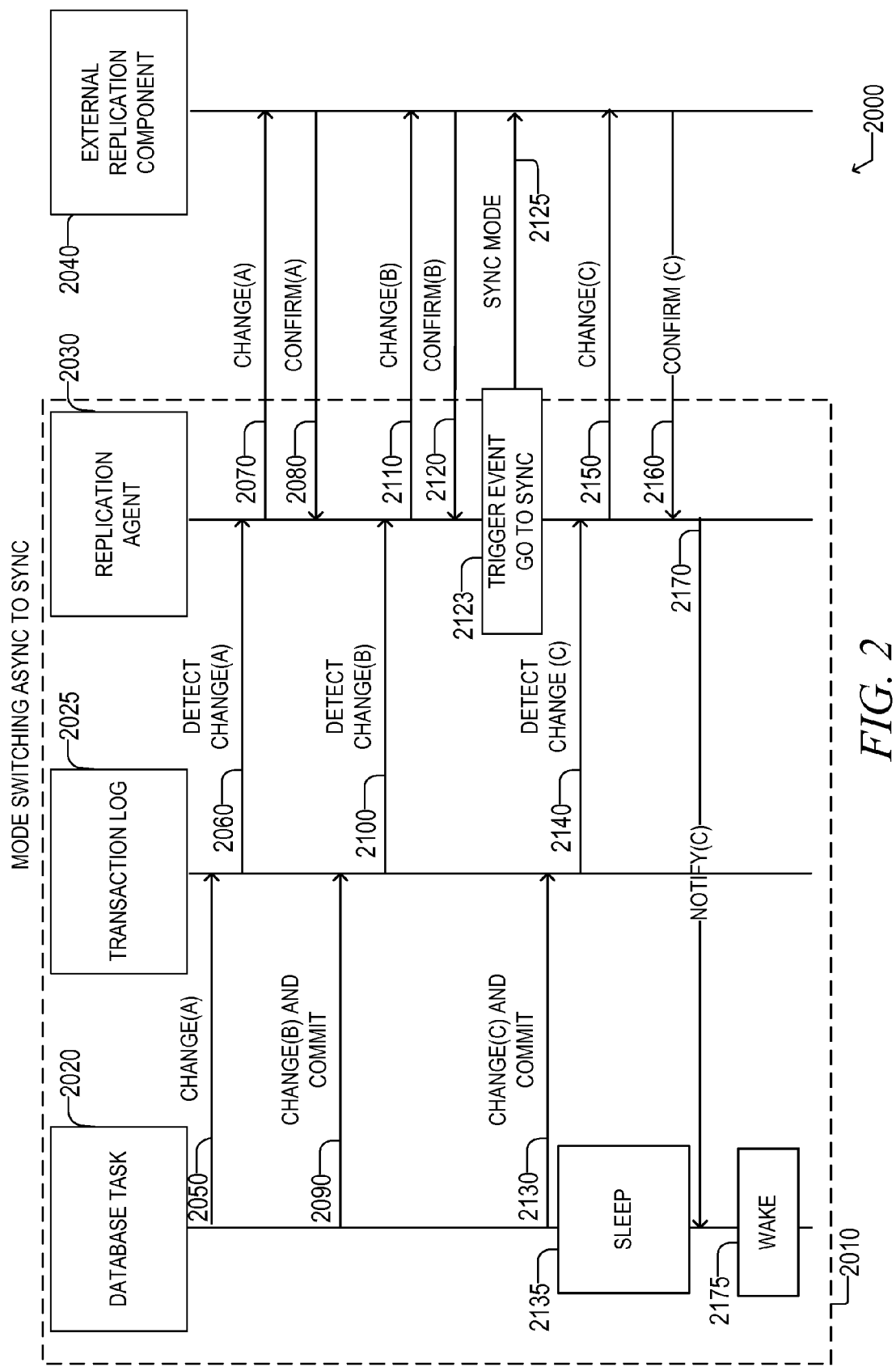
FIG. 2 shows a notification sequence chart of a replication mode switch from asynchronous to synchronous according to some example embodiments.

FIG. 2 shows an example notification sequence chart 2000 of a replication mode switch from asynchronous to synchronous according to some examples of the present disclosure. The RDMS 2010 begins operating in an asynchronous mode. The database task 2020 makes a database change (e.g., CHANGE(A)) and writes the change to the transaction log 2025 at 2050. The replication agent 2030 detects this change at 2060, and in response, the replication agent 2030 sends this change to the external replication component 2040 at 2070. The external replication component 2040 may confirm this change with a notification at 2080. The database task 2020 can make other changes, such as a change (e.g., CHANGE(B)) at 2090. The change at 2090 includes a commit instruction. Unlike for synchronous mode, the database task 2020 does not wait for a confirmation from external replication component 2040. CHANGE (B) is detected by the replication agent 2030 at 2100 and the replication agent 2030 sends the change to the external replication component 2040 at 2110. The external replication component 2040 notifies the replication agent 2030 with a confirmation at 2120. Note that while FIG. 2 shows a situation in which individual changes are sent to the external replication component 2040, in some example embodiments changes can be processed in batches. For example, the replication agent 2030 may scan the transaction log 2025 at predetermined intervals of time. Thus, CHANGE(A) and CHANGE(B) could be sent to the external replication component 2040 in a single communication.

The replication agent 2030 may receive or determine an event that causes the replication agent 2030 to change the replication mode. For example, a triggering event can indicate that the replication mode should switch from an asynchronous replication mode to a synchronous replication mode. For example, the replication agent 2030 may have placed the RDMS 2010 into an asynchronous mode when the replication agent 2030 restarts after an event that causes the replication agent 2030 to become suspended. Placing the RDMS 2010 in the asynchronous mode allows the replication agent 2030 to catch up to database changes that happened while the replication agent 2030 was restarting while allowing the database task 2020 to continue without delays. In this example, the trigger event for the replication agent 2030 to switch the replication mode to synchronous mode can be when the replication agent 2030 reaches the end of the database log (and is therefore caught up). When the triggering event is detected at 2123 (e.g., the replication agent 2030 reaching the end of the database log), the replication agent 2030 switches the replication mode by placing the RDMS 2010 in synchronous mode, for example, if the RDMS 2010 is configured to return operation to a synchronous mode.

Once the trigger event is detected and the replication mode is switched, database changes from the database task 2020 are subsequently updated synchronously, and the replication agent 2030 notifies the external replication component 2040 of the change to a synchronous replication mode at 2125. For example, if the database task 2020 commits a change (e.g., CHANGE(C)) to the transaction log 2025 at 2130. As the change (e.g., CHANGE(C)) includes a commit instruction, and the RDMS 2010 is now in synchronous mode, the database task 2020 goes to sleep at 2135. The database task 2020 waits in sleep mode until receiving notification 2170 from the replication agent 2030 before continuing with operations. The replication agent 2030 detects the change (e.g., CHANGE(C)) at 2140 and sends the change to the external replication component 2040 at 2150. Once the external replication component 2040 receives the message indicating the change at 2150, the external replication component 2040 sends confirmation of receipt of the change at 2160 to the replication agent 2030. The replication agent 2030 notifies the database task 2020 at 2170 of the confirmation. Once the database task 2020 receives the notification 2170 that the database change C was successful, the database task 2020 wakes at 2175. As noted with FIG. 1, in addition to, or instead of, notifying the external replication component 2040 when a mode change occurs (e.g., at 2125), the replication agent 2030 can include information on the current mode when sending changes to the external replication component 2040. Thus, for example, the messages sent at 2070, 2110, 2150 can specify the RDMS' current replication mode.

Note that only one database task 1020 and 2020 is shown in the figures; however, multiple database tasks may be executing on the RDMS 2010. The various notifications from the replication agent 1030 and 2030 (e.g., notifications 1130, 1170, and 2170) may be to multiple database tasks. Thus, a notification can wake up multiple database tasks.

The following lists a number of example events that can trigger changes from asynchronous to synchronous or vice versa.

End of log: If the RDM's configured mode is a synchronous mode, the asynchronous mode is a transitional state that is utilized until the replication agent can change over to the synchronous mode at the end of the transaction log.

For instance, when the replication agent is starting up, the replication agent can begin in asynchronous replication mode to catch up to any transactions that occurred while the replication agent was not running. The replication agent can start at the beginning of the database log and replicate old transactions until the replication agent reaches the end of the log.

Timeout: When the replication agent is replicating in synchronous mode and the confirmation time exceeds a configurable (or predetermined) timeout value, the mode can be changed from synchronous to asynchronous. This allows database tasks to continue processing without being blocked waiting for the replication to complete. In some example embodiments, the replication agent continues to monitor network communications and if the replication agent determines that the network conditions have improved (e.g., by analyzing metrics such as bandwidth, latency, round trip time, and/or the like) sufficiently, the replication agent can switch back to a synchronous mode of operation. In some examples, the replication agent attempts to return to synchronous mode. This can be implemented by forcing a slowdown of database tasks in order to catch up to the end of the log. This can be done to prevent database tasks running in parallel from generating so many transactions in the transaction log that it would prevent the replication agent from reaching the end of the log. Once the end of the log is reached, the RDMS may transition back to synchronous mode.

In some example embodiments, to implement a zero data loss system, the timeout value may be disabled (or configured to an infinite or arbitrarily high number) so that the RDMS does not switch over to an asynchronous mode as a result of a timer expiry. In some examples, a zero data loss system maintains a synchronous replication mode so as to ensure transactions are always replicated before other changes are made.

Stop of the replication agent: To allow database tasks processing to continue uninterrupted, the replication mode can be switched to an asynchronous mode as part of the shutdown process of the replication agent.

User requested mode change: The database management or the database task can request the RDMS to run in a different mode.

In examples where the mode is changed from synchronous to asynchronous, the change can be immediate. In the case where the mode is changed from asynchronous to synchronous replication, the mode switch can be deferred in some example embodiments until the end of the database log is reached, until all confirmations have been received for pending commits, or the like.

Figure 3:
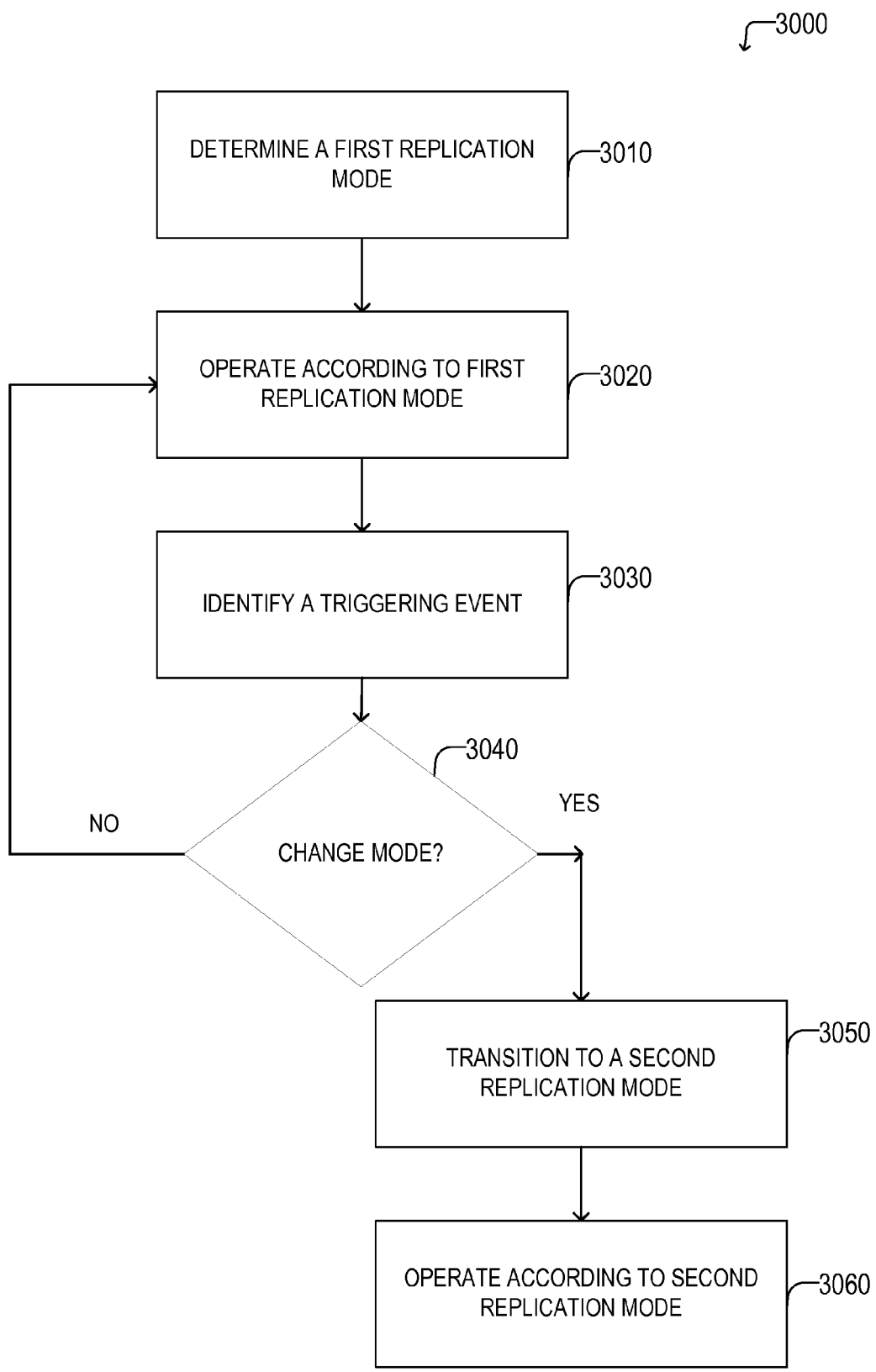
FIG. 3 shows a flowchart of a method of a replication agent changing replication modes according to some example embodiments.

FIG. 3 shows a flowchart of an example method 3000 of a replication agent changing replication modes according to some examples of the present disclosure. The method 3000 can be performed by processing logic that can comprise hardware (e.g., circuitry, dedicated logic, programmable logic, microcode, etc.), software (e.g., instructions run on a processing device), or a combination thereof. In one implementation, the method 3000 is performed by an RDMS such as RDMS 5010 of FIG. 5, as described below.

At operation 3010, the replication agent determines a first replication mode. For example, the replication agent can be setup via configuration data stored on a data store to prefer a synchronized or unsynchronized mode. At operation 3020, the replication agent operates according to the determined mode from operation 3010. At operation 3030, a triggering event is received, detected, and/or identified. At operation 3040, the replication agent determines whether or not the triggering event indicates that a replication mode should be changed, and if it should be changed, the replication agent can determine which mode to change it to. For example, the replication agent can utilize a set of rules (e.g., a table, or a set of if-then statements) which determine whether or not to change the replication state based upon the current replication mode and the event. If the mode is not to be changed, the replication agent can continue to operate according to the first replication mode at operation 3020. If the replication agent determines that the mode should transition to a second replication mode (different than the first mode) the replication agent transitions to the second replication mode at operation 3050. The transition can be immediate, or can be deferred until some later event. The transition can involve notifying other components such as the external replication component or one or more database tasks of the change. Once the transition is complete, the replication agent operates according to the second replication mode at operation 3060. While the replication agent operated according to the first replication mode at operation 3020, in some example embodiments, a triggering event 3030 can be received prior to operating in the first replication mode 3020 (e.g., prior to any actual replications).

Figure 4:
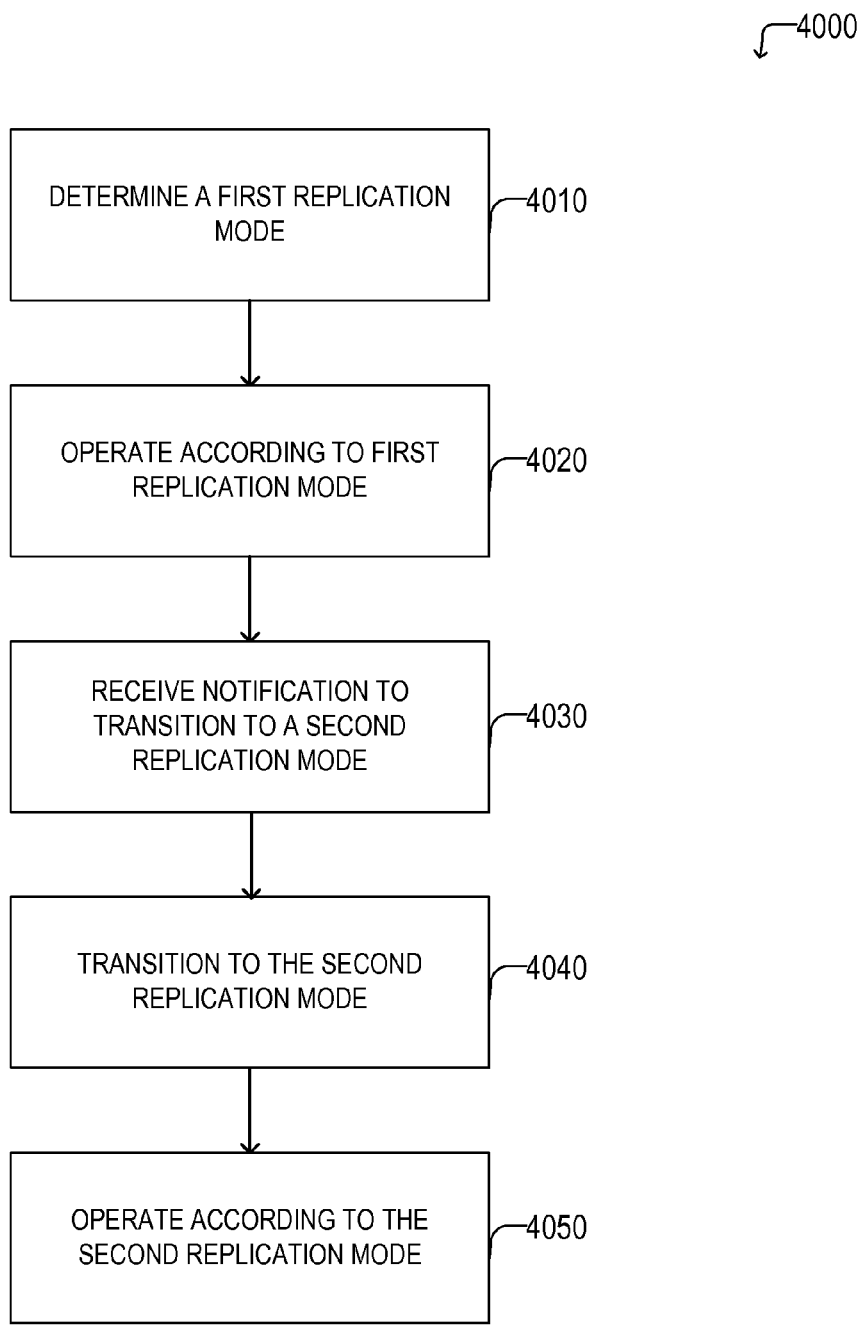
FIG. 4 shows a flowchart of a method of a database task according to some example embodiments.

FIG. 4 shows an example method 4000 of a database task according to some examples of the present disclosure. The method 4000 can be performed by processing logic that can comprise hardware (e.g., circuitry, dedicated logic, programmable logic, microcode, etc.), software (e.g., instructions run on a processing device), or a combination thereof. In one implementation, the method 4000 is performed by the database task of the RDMS of FIG. 5, as described below. At operation 4010, the database task determines the current replication mode. For example, the database task determines whether the current replication mode is synchronous, asynchronous, or the like. In some example embodiments, the database task can have a preference, or can request a particular mode based on configuration data that is stored in a data store. At operation 4020, the database task operates according to the first replication mode (e.g., either synchronous or asynchronous). At operation 4030, the database task receives a notification (e.g., from the replication agent) to transition to a second replication mode (different than the first). At operation 4040, the database task transitions to the second replication mode. In some example embodiments, the transition can be made instantaneous. In other examples, the transition can be deferred until another event occurs. For example, in order to complete the transition, the database task may have to wait for a second triggering event. Once the transition is complete, at operation 4050, the database task operates according to the second mode. While FIG. 4 shows that the database task is notified of the replication mode change, in other examples, the replication agent can simulate the synchronous mode of replication by confirming commits without actually receiving the confirmation from the external replication component. Thus, in some examples, the switch can be transparent to the database task which means that the database task may require no changes to switch between synchronous and asynchronous modes.

Figure 5:
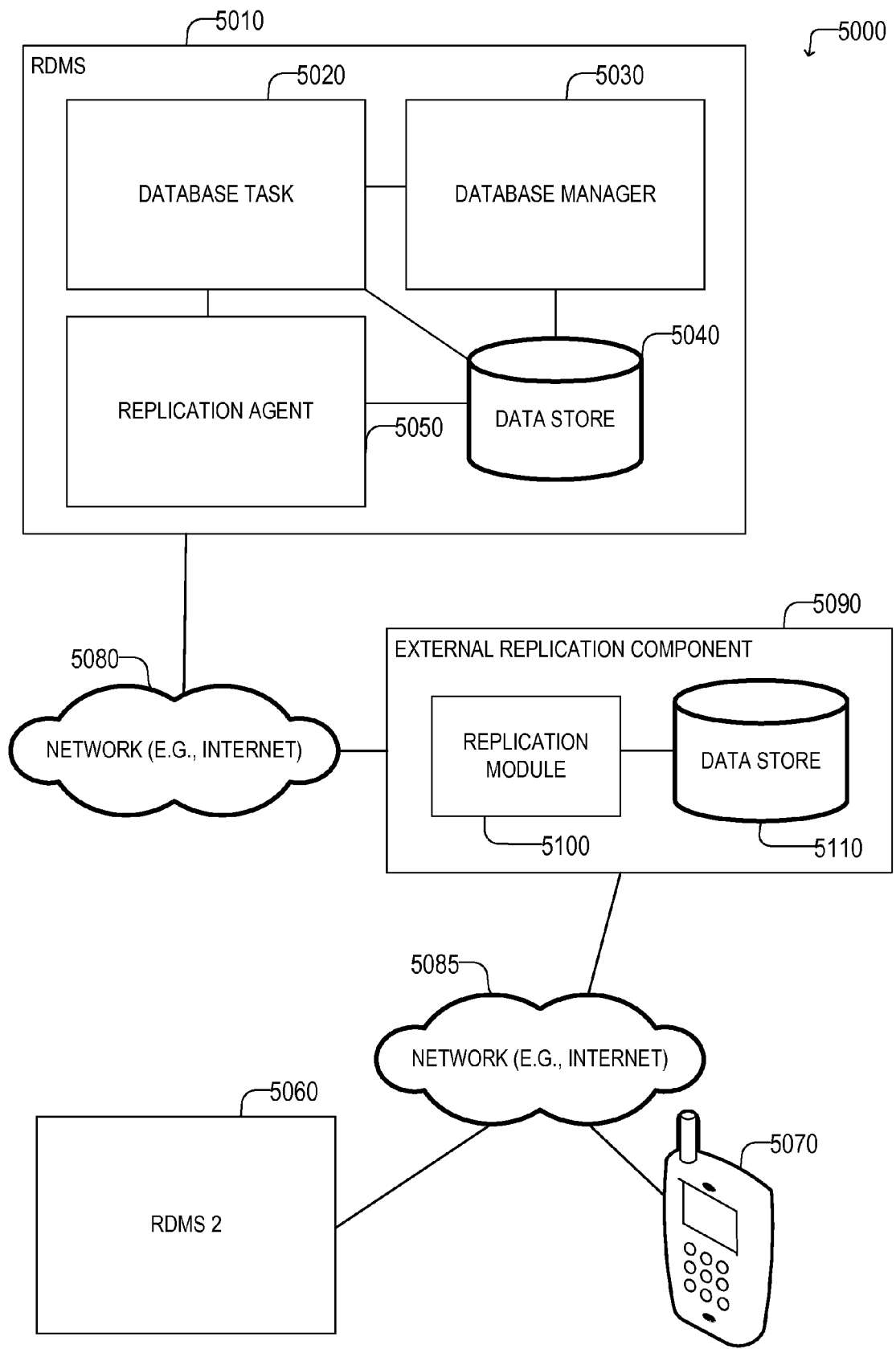
FIG. 5 shows a schematic of a replicated database system according to some example embodiments.

FIG. 5 shows a schematic of a replication database system 5000 according to some examples of the present disclosure. An RDMS 5010 can include a database manager 5030, a data store 5040, one or more database tasks 5020, and a replication agent 5050. The database manager 5030 manages data stored in data store 5040. For example, the database manager 5030 organizes, tracks, and controls data stored in data store 5040 to form one or more structured relational databases (hereinafter referred to as "databases" or "database").

The RDMS 5010 can include one or more database tasks 5020. The database task 5020 can be any process, thread, or program which can make changes to the databases provided by the database manager 5030 and the data store 5040. The database task 5020 can provide one or more services using the data stored in the data store 5040. The database task 5020 can read, write, and modify data in data store 5040 by issuing commands to the database manager 5030. In some example embodiments the database task 5020 can use one or more Structured Query Language (SQL) commands to access the data stored in the data store 5040. In some example embodiments, the database manager 5030 can log the changes made to the data store 5040 in a transaction log. The transaction log can be stored in the data store 5040. The database task 5020 can be aware of and respond to the current replication mode and be aware of and respond to changes in the replication mode. For example, when the replication mode is synchronous, the database task 5020 can wait for a confirmation from the replication agent 5050 before proceeding with further operations on the database. As another example, when the mode is asynchronous, the database task 5020 can continue with further database operations regardless of whether a confirmation has been received.

The replication agent 5050 can monitor the data store 5040 for changes to the data in the database and replicate the changes to the data to one or more other RDMSs 5060 or other devices 5070 (e.g., such as a mobile device, smartphone, desktop, tablet computer, laptop computer, and the like) through an external replication component 5090. An external replication component 5090 can be accessible over a packet based network 5080 (e.g., the internet, a local area network, a wide area network, or the like). In some example embodiments, the replication agent 5050 can determine changes to the database based upon the transaction log managed by the database manager 5030.

Replication operations can utilize the external replication component 5090 to assist in replicating data from the data store 5040 to other RDMSs 5060, devices 5070, and the like. The RDMS 5060 and the device 5070 may be connected to the external replication component 5090 through network 5085. The network 5085 may be or include portions of the network 5080. The external replication component 5090 can include a replication module 5100 and a data store 5110. The replication module 5100 can communicate with the replication agent 5050 from the RDMS 5010 and other replication agent modules on the devices 5070 and the RDMS 5060 (replication agent module on RDMS 5060 not shown for clarity). The replication module 5100 can receive subscription requests for devices that wish to receive updates to the data and when updates are reported by a replication agent (e.g., replication agent 5050), the replication module 5100 can update the data in its local data store 5110 and can send the subscribed devices updates to the database based upon their subscriptions. The replication module 5100 can respond to a device which updates the data with a confirmation upon receipt of the indication and/or upon storage of the update.

The replication agent 5050 can also receive information on updates to data stored in the database from other RDMSs, such as the RDMS 5060, the devices 5070 and the like. The replication agent 5050 can subscribe to receive updates to data on the data store 5040 with the external replication component 5090 so as to receive updates from other devices which can update the data. The replication agent 5050 can notify the database task 5020, the database manager 5030 or other processes on the RDMS 5010 of any received changes. The replication agent 5050 can then commit received changes to the data store 5040 either directly or through the database manager 5030 or the database task 5020.

The replication agent 5050 can determine or receive events which indicate a replication mode should be switched from a preferred mode to another mode. For example, if the preferred mode is a synchronous mode and an event occurs, the replication agent 5050 can determine if the replication mode should be switched to an asynchronous mode. If the preferred mode is an asynchronous mode and an event occurs, the replication agent 5050 can determine if the replication mode should be switched to a synchronous mode. The replication agent 5050 can notify any of the interested modules in the RDMS 5010 (such as the database task 5020, the database manager 5030, or the like) of the change. In some example embodiments, the replication agent 5050 can also keep the external replication component 5090 up-to-date on the current mode. This can be done by sending update messages, or by including the current mode in notifications announcing changes to data on the database.

The RDMS 5010 can include additional modules not shown which manage the database, execute SQL statements, manage the database task 5020, and the like. Additionally the various modules shown in the RDMS 5010 may be combined.

Figure 6:
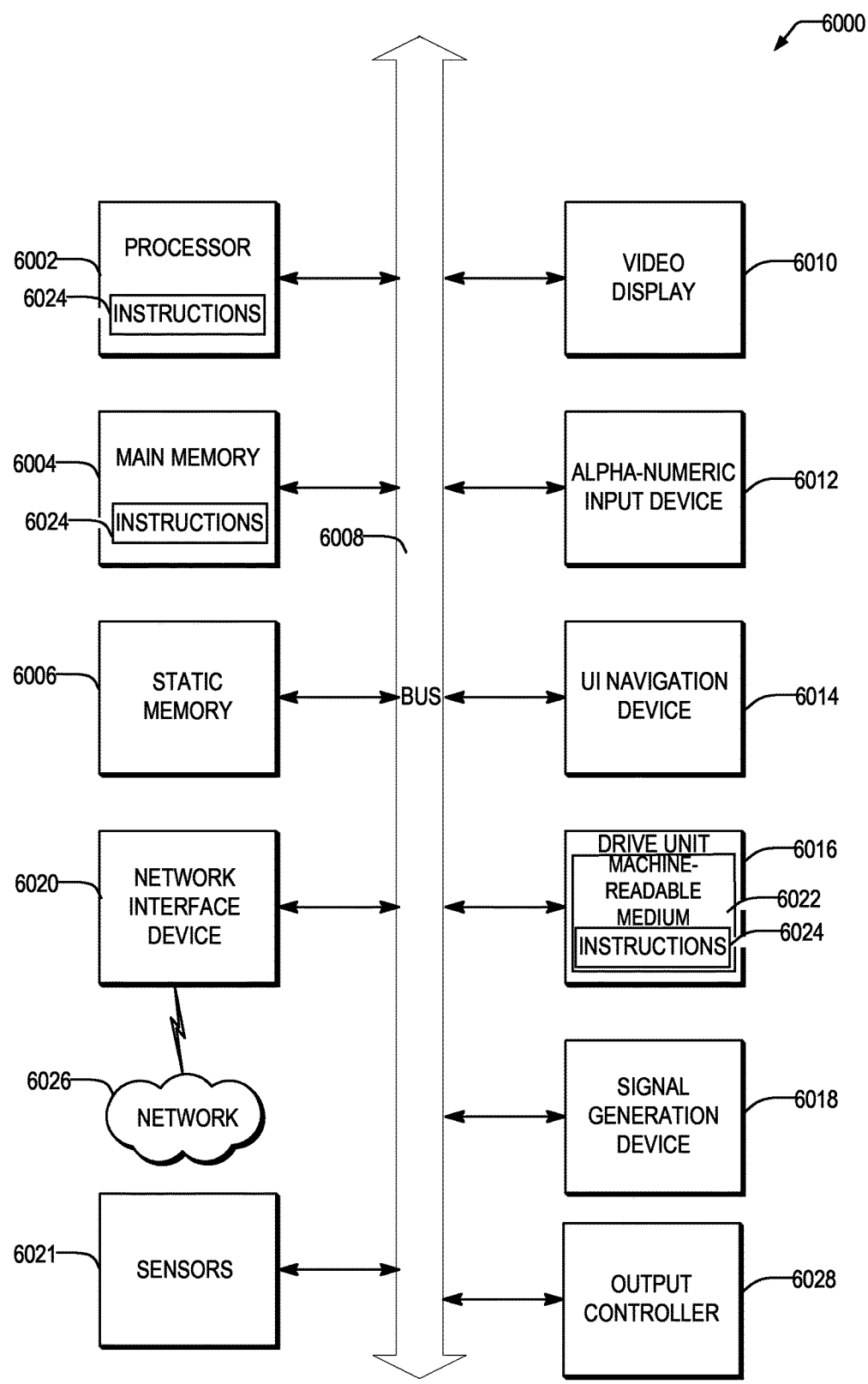
FIG. 6 is a block diagram illustrating an example of a machine upon which one or more example embodiments can be implemented.

FIG. 6 illustrates a block diagram of an example machine 6000 upon which any one or more of the techniques (e.g., methodologies) discussed herein can be performed. In alternative embodiments, the machine 6000 can operate as a standalone device or can be connected (e.g., networked) to other machines. In a networked deployment, the machine 6000 can operate in the capacity of a server machine, a client machine, or both in server-client network environments. In an example, the machine 6000 can act as a peer machine in peer-to-peer (P2P) (or other distributed) network environment. The machine 6000 can be an RDMS, an external replication component, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations and can be configured or arranged in a certain manner. In an example, circuits can be arranged (e.g., internally or with respect to external entities such as other circuits) in a specified manner as a module. In an example, the whole or part of one or more computer systems (e.g., a standalone, client or server computer system) or one or more hardware processors can be configured by firmware or software (e.g., instructions, an application portion, or an application) as a module that operates to perform specified operations. In an example, the software can reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor can be configured as respective different modules at different times. Software can accordingly configure a hardware processor, for example, to constitute a particular module at one instance of time and to constitute a different module at a different instance of time.

The machine (e.g., computer system) 6000 can include a hardware processor 6002 (e.g., a central processing unit (CPU), a graphics processing unit (GPU), a hardware processor core, or any combination thereof), a main memory 6004 and a static memory 6006, some or all of which can communicate with each other via an interlink (e.g., bus) 6008. The machine 6000 can further include a video display 6010, an alphanumeric input device 6012 (e.g., a keyboard), and a user interface (UI) navigation device 6014 (e.g., a mouse). In an example, the video display 6010, input device 6012 and UI navigation device 6014 can be a touch screen display. The machine 6000 can additionally include a storage device (e.g., drive unit) 6016, a signal generation device 6018 (e.g., a speaker), a network interface device 6020, and one or more sensors 6021, such as a global positioning system (GPS) sensor, compass, accelerometer, or other sensor. The machine 6000 can include an output controller 6028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 6016 can include a machine readable medium 6022 on which is stored one or more sets of data structures or instructions 6024 (e.g., software) embodying or utilized by any one or more of the techniques or functions described herein. The instructions 6024 can also reside, completely or at least partially, within the main memory 6004, within static memory 6006, or within the hardware processor 6002 during execution thereof by the machine 6000. In an example, one or any combination of the hardware processor 6002, the main memory 6004, the static memory 6006, or the storage device 6016 can constitute machine readable media.

While the machine readable medium 6022 is illustrated as a single medium, the term "machine readable medium" can include a single medium or multiple media (e.g., a centralized or distributed database, and/or associated caches and servers) configured to store the one or more instructions 6024.

The term "machine readable medium" can include any medium that is capable of storing, encoding, or carrying instructions for execution by the machine 6000 and that cause the machine 6000 to perform any one or more of the techniques of the present disclosure, or that is capable of storing, encoding or carrying data structures used by or associated with such instructions. Non-limiting machine readable medium examples can include solid-state memories, and optical and magnetic media. Specific examples of machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some example embodiments, machine readable media can include non-transitory machine readable media. In some example embodiments, machine readable media can include machine readable media that is not a transitory propagating signal.

The instructions 6024 can further be transmitted or received over a communications network 6026 using a transmission medium via the network interface device 6020. The machine 6000 can communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 6020 can include one or more physical jacks (e.g., Ethernet, coaxial, or phone jacks) or one or more antennas to connect to the communications network 6026. In an example, the network interface device 6020 can include a plurality of antennas to wirelessly communicate using at least one of single-input multiple-output (SIMO), multiple-input multiple-output (MIMO), or multiple-input single-output (MISO) techniques. In some example embodiments, the network interface device 6020 can wirelessly communicate using Multiple User MIMO techniques.

What is claimed is:

1. A method of database replication, the method comprising:

at a Relational Database Management System (RDMS), using one or more computer processors:

determining a first replication mode associated with a replication agent;

identifying a triggering event;

determining that the triggering event indicates a change in the first replication mode of the replication agent;

responsive to determining that the triggering event indicates a change in the first replication mode, determining a second replication mode, the second replication mode being a different replication mode than the first replication mode;

in response to determining the triggering event, identifying a set of database tasks being processed in parallel, one or more database tasks of the set of database tasks being associated with a database change;

determining a task replication mode for at least one of the one or more database tasks;

replicating the database change to an external replication component according to the second replication mode;

passing a notification to the one or more database tasks of the set of database tasks associated with the database change, the notification simulating the first replication mode regardless of receipt of confirmation from the external replication component;

reducing a rate of processing of the set of database tasks running in parallel, the rate of processing reduced by a replication agent causing throttling the processing of one or more database tasks of the set of database tasks until a second triggering event is detected;

determining a second triggering event in response to reducing the rate of processing of the set of database tasks; and responsive to determining the second triggering event, reverting to the first replication mode.

2. The method of claim 1, wherein the second replication mode is an asynchronous replication mode and the second triggering event is an improvement in a network connection with the external replication component.

3. The method of claim 1, wherein the method further comprises:

identifying a previous database change made by the one or more database tasks prior to identifying the triggering event; and replicating the previous database change to the external replication component according to the first replication mode.

4. The method of claim 3, wherein the second replication mode is an asynchronous mode, the first replication mode is a synchronous mode, and the second triggering event is reaching an end of a database change log.

5. The method of claim 3, wherein the first replication mode is a synchronous mode, the second replication mode is an asynchronous mode, and the triggering event is an expiry of a timer set to await confirmation of a replication of the previous database change.

6. The method of claim 3, wherein the first replication mode is a synchronous mode, the second replication mode is an asynchronous mode, and the triggering event is a shutdown of a replication agent.

7. The method of claim 1, wherein the triggering event is responsive to a user request to change the replication mode.

8. A Relational Database Management System (RDMS) comprising:

one or more computer processors; and a replication agent executed by the one or more computer processors to:

determine a first replication mode associated with the replication agent;

identify a triggering event;
determine that the triggering event indicates a change in the first replication mode of the replication agent;
responsive to determining that the triggering event indicates a change in the first replication mode, determine a second replication mode, the second replication mode being a different replication mode than the first replication mode;
in response to determining the triggering event, identifying a set of database tasks being processed in parallel, one or more database tasks of the set of database tasks being associated with a database change;
determining a task replication mode for at least one of the one or more database tasks;
replicate a database change to an external replication component according to the second replication mode;
passing a notification to the one or more database tasks of the set of database tasks associated with the database change, the notification simulating the first replication mode regardless of receipt of confirmation from the external replication component
reducing a rate of processing of the set of database tasks running in parallel, the rate of processing reduced by a replication agent causing throttling the processing of one or more database tasks of the set of database tasks until a second triggering event is detected;
determining a second triggering event in response to reducing the rate of processing of the set of database tasks; and
responsive to determining the second triggering event, reverting to the first replication mode.

9. The RDMS of claim 8, wherein the second replication mode is an asynchronous replication mode and the second triggering event is an improvement in a network connection with the external replication component.

10. The RDMS of claim 8, wherein the replication agent is configured to:
identify a previous database change made by one or more database tasks prior to identifying the triggering event; and
replicate the previous database change to the external replication component according to the first replication mode.

11. The RDMS of claim 10, wherein the second replication mode is an asynchronous mode, the first replication mode is a synchronous mode, and the second triggering event is reaching the end of a database change log.

12. The RDMS of claim 10, wherein the first replication mode is a synchronous mode, the second replication mode is an asynchronous mode, and the triggering event is an expiry of a timer set to await confirmation of the replication of the previous database change.

13. The RDMS of claim 10, wherein the first replication mode is a synchronous mode, the second replication mode is an asynchronous mode, and the triggering event is a shutdown of the replication agent.

14. The RDMS of claim 8, wherein the triggering event is responsive to a user request to change the replication mode.

15. A machine readable medium that stores instructions which, when performed by a machine, cause the machine to perform operations comprising:
identifying a triggering event;
determining that the triggering event indicates a change in a first replication mode associated with a replication agent;
responsive to determining that the triggering event indicates a change in the first replication mode, determining a second replication mode;
in response to determining the triggering event, identifying a set of database tasks being processed in parallel, one or more database tasks of the set of database tasks being associated with a database change;
determining a task replication mode for at least one of the one or more database tasks;
replicating the database change to an external replication component according to the second replication mode;
passing a notification to the one or more database tasks of the set of database tasks associated with the database change, the notification simulating the first replication mode regardless of receipt of confirmation from the external replication component;
reducing a rate of processing of the set of database tasks running in parallel, the rate of processing reduced by a replication agent causing throttling the processing of one or more database tasks of the set of database tasks until a second triggering event is detected;
determining a second triggering event in response to reducing the rate of processing of the set of database tasks; and
responsive to determining the second triggering event, reverting to the first replication mode.

16. The machine readable medium of claim 15, wherein the second replication mode is an asynchronous replication mode and the second triggering event is an improvement in a network connection with the external replication component.

17. The machine readable medium of claim 15, wherein the operations comprise:
identifying a previous database change made by the one or more database tasks prior to identifying the triggering event; and
replicating the previous database change to the external replication component according to the first replication mode.

18. The machine readable medium of claim 17, wherein the second replication mode is an asynchronous mode, the first replication mode is a synchronous mode, and the second triggering event is reaching the end of a database change log.

19. The machine readable medium of claim 17, wherein the first replication mode is a synchronous mode, the second replication mode is an asynchronous mode, and the triggering event is an expiry of a timer set to await confirmation of the replication of the previous database change.

20. The machine readable medium of claim 17, wherein the first replication mode is a synchronous mode, the second replication mode is an asynchronous mode, and the triggering event is a shutdown of a replication agent.

* * * * *